B. D. CHAMBERLIN.
APPARATUS FOR THE PRODUCTION OF GLASS ARTICLES.
APPLICATION FILED JAN. 13, 1911.
1,124,698.
Patented Jan. 12, 1915.
11 SHEETS—SHEET 1.
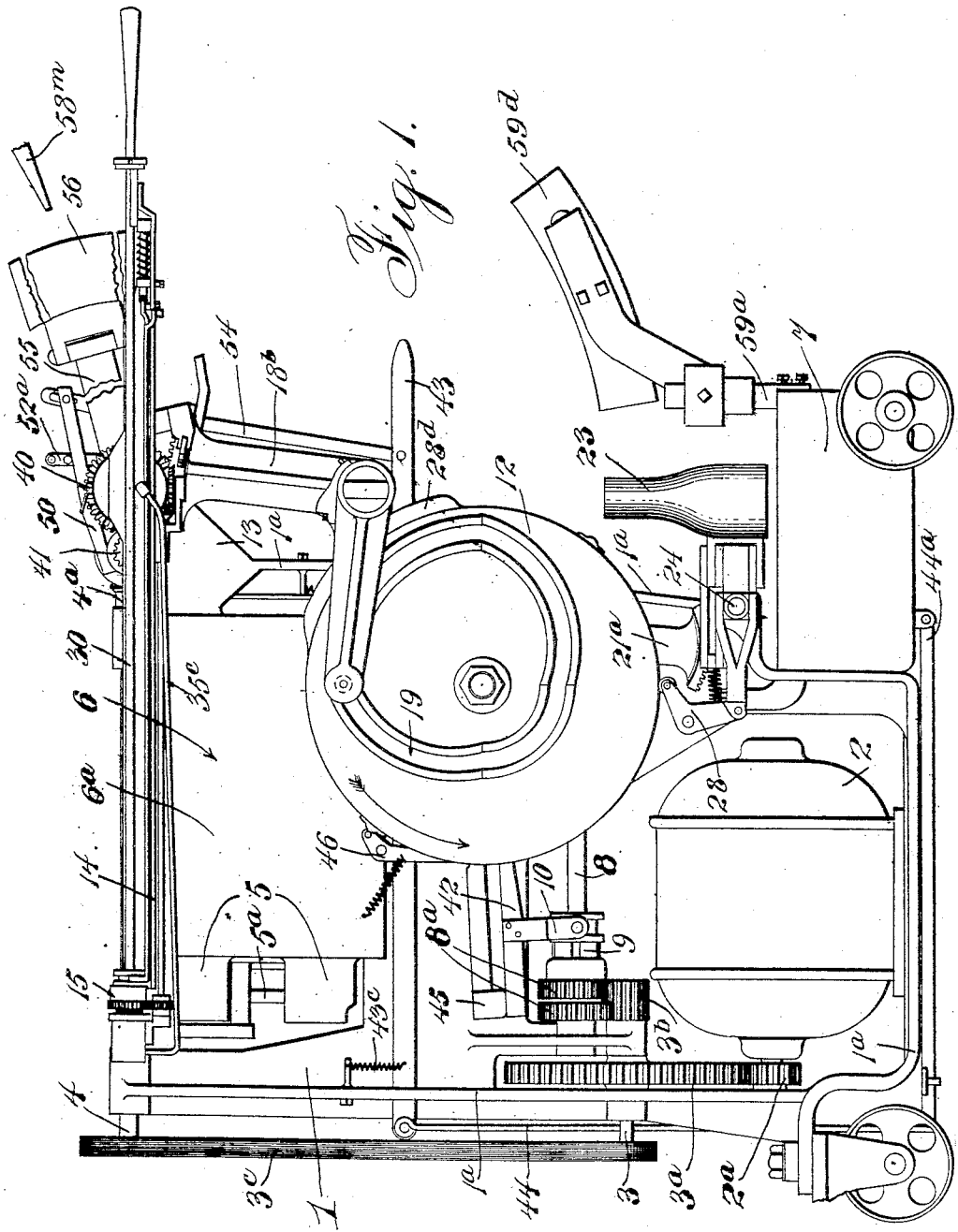

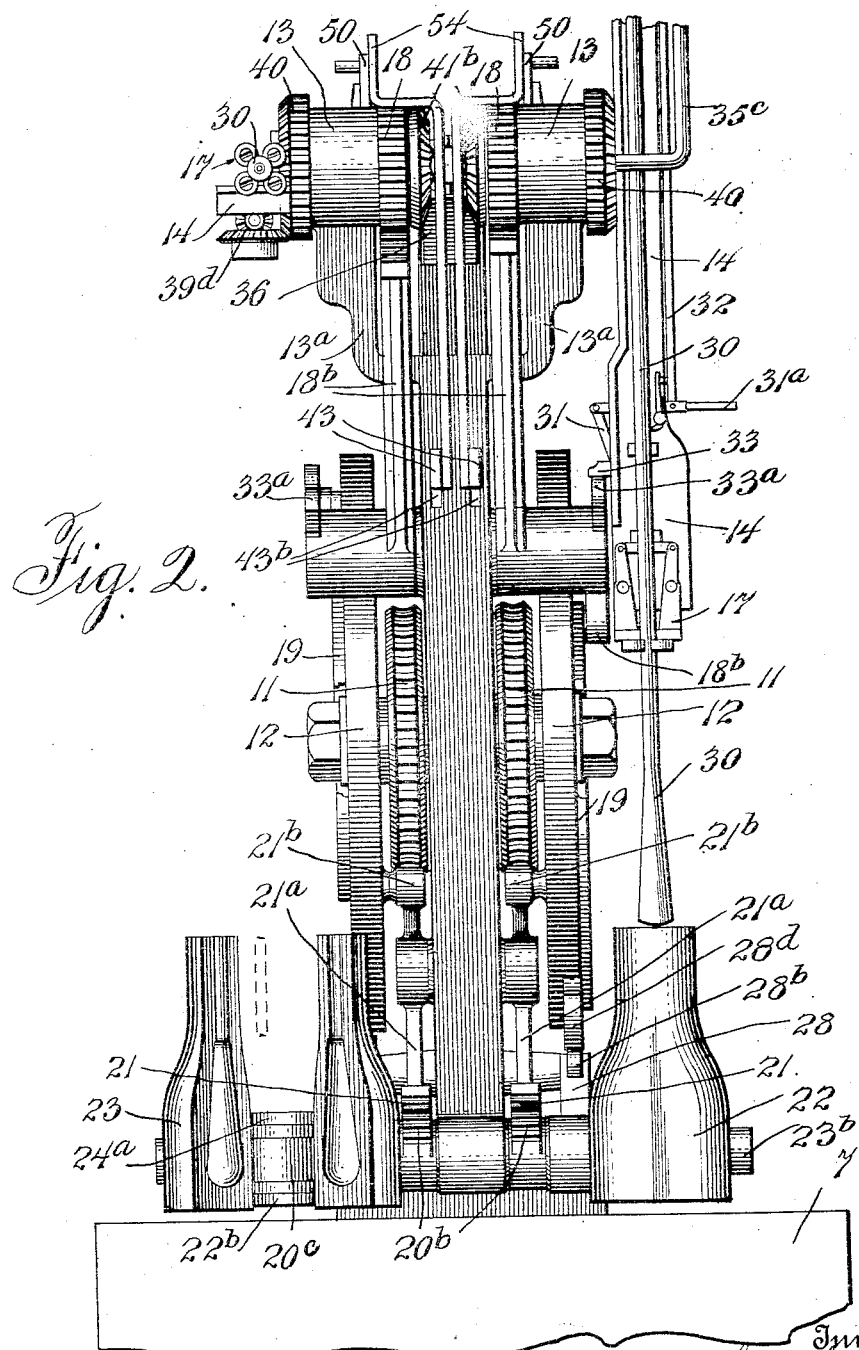

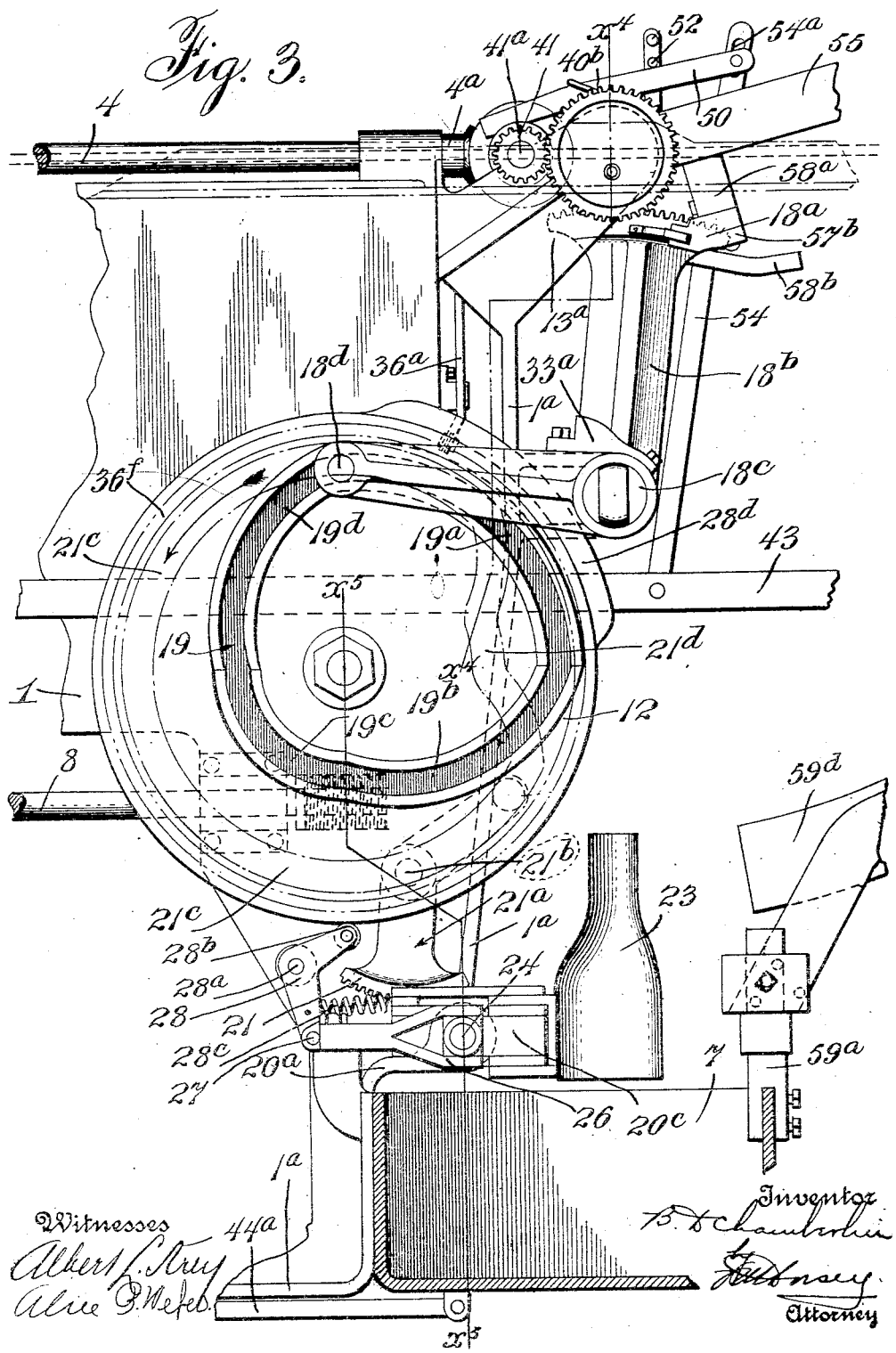

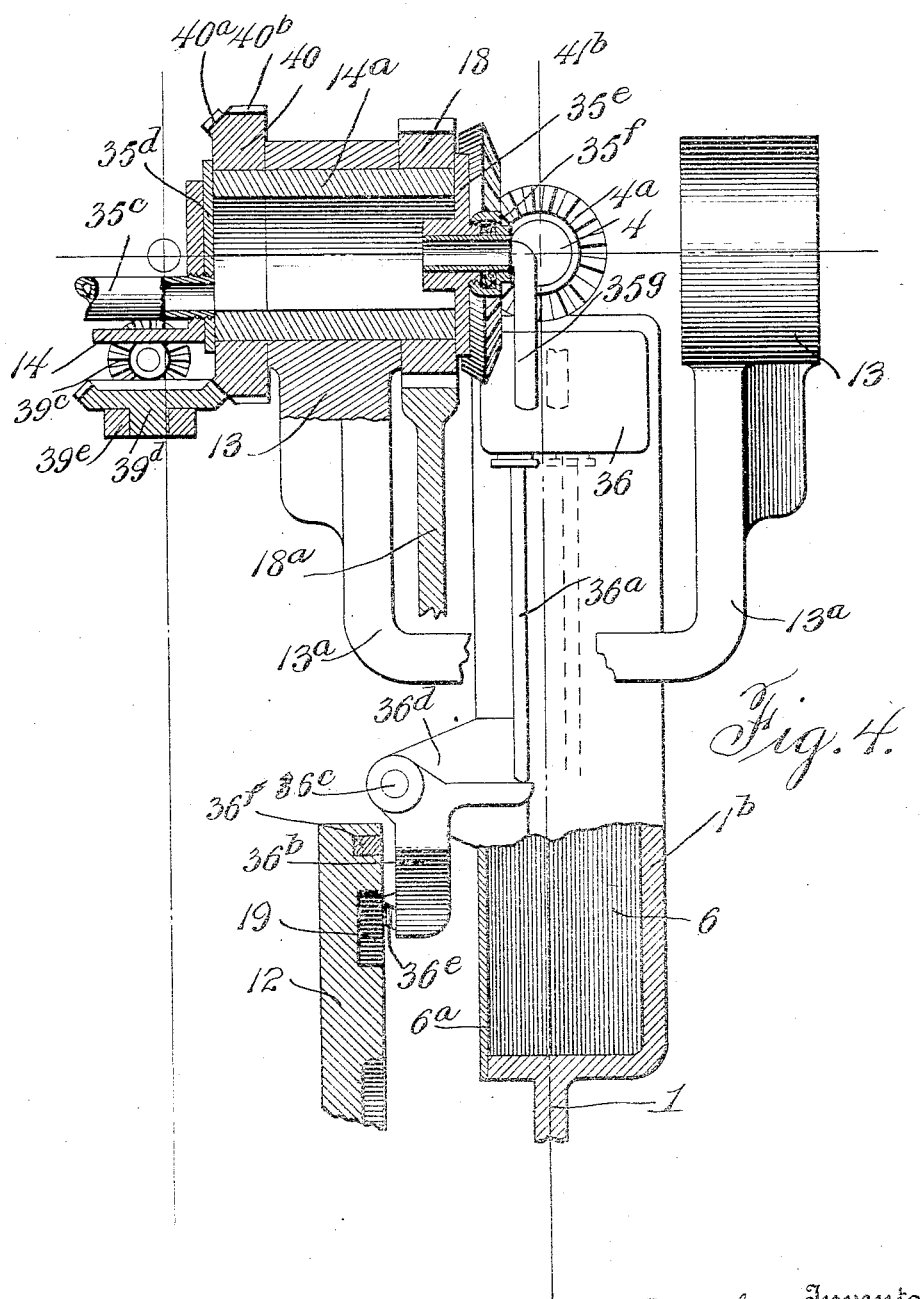

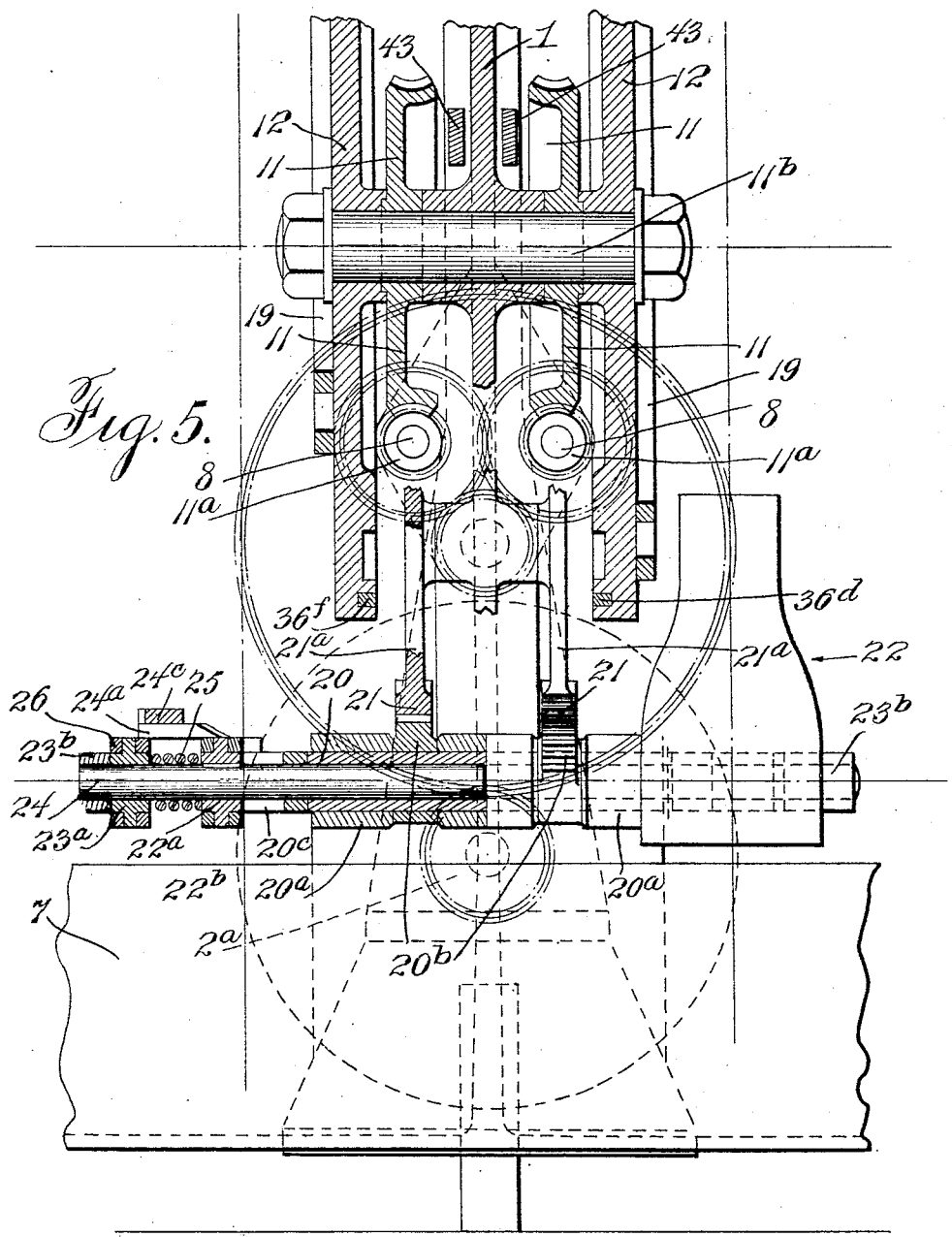

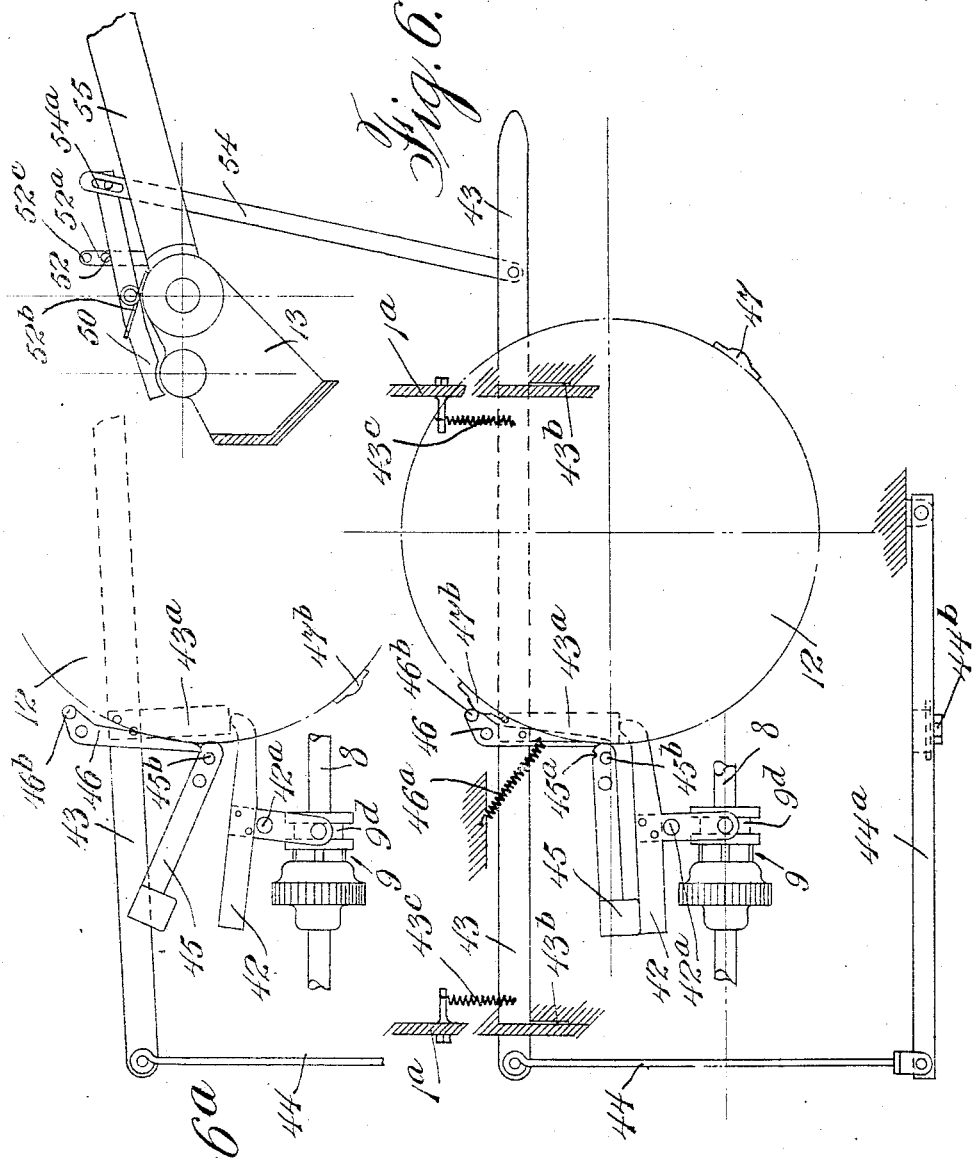

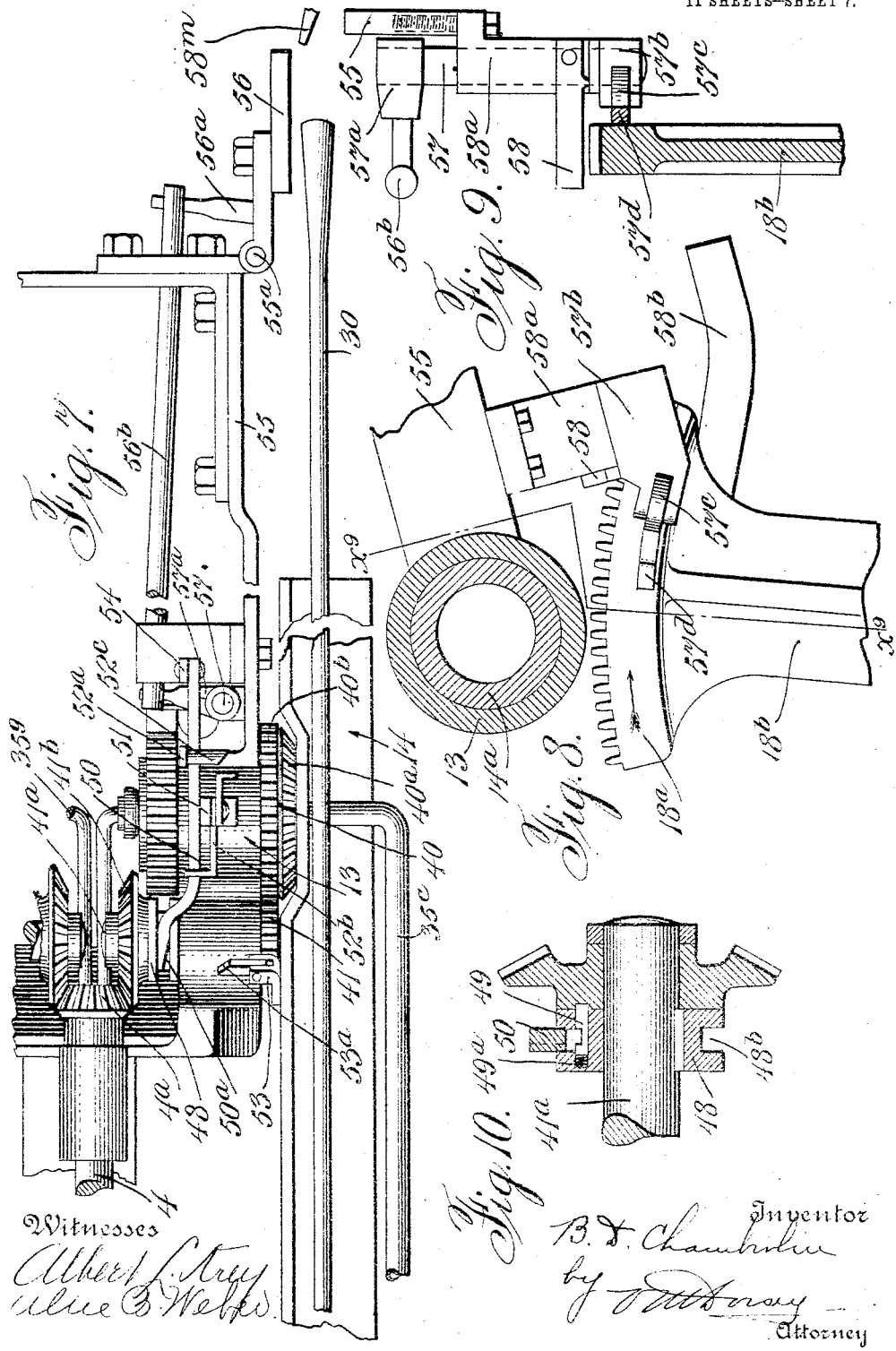

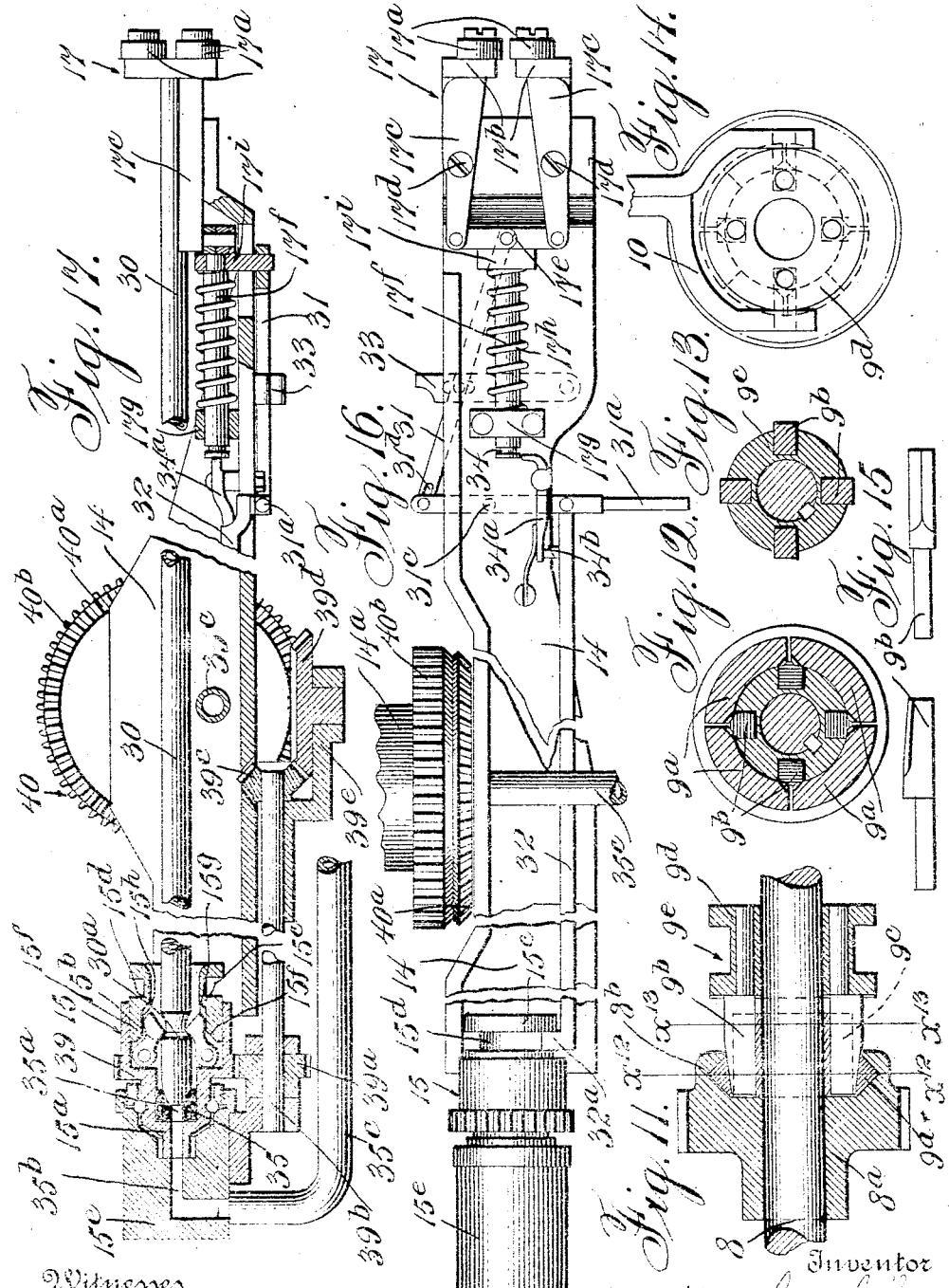

B. D. CHAMBERLIN.
APPARATUS FOR THE PRODUCTION OF GLASS ARTICLES.
APPLICATION FILED JAN. 13, 1911.
1,124,698.
Patented Jan. 12, 1915.
11 SHEETS—SHEET 9.
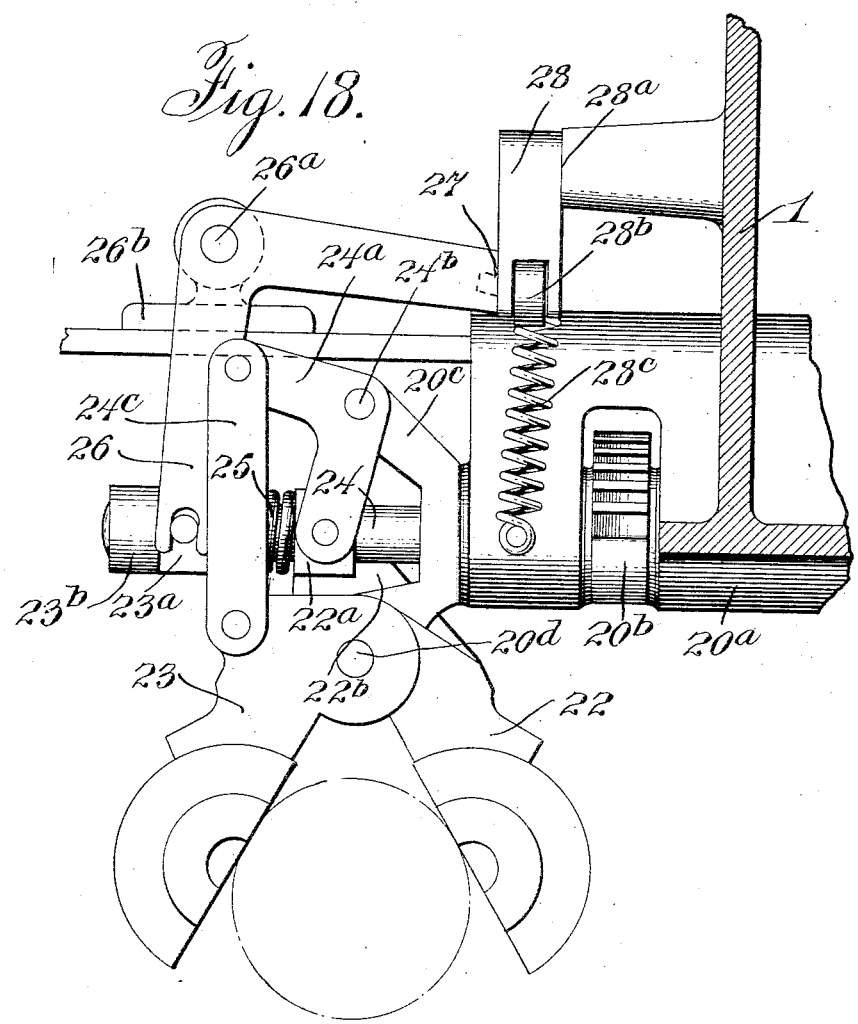

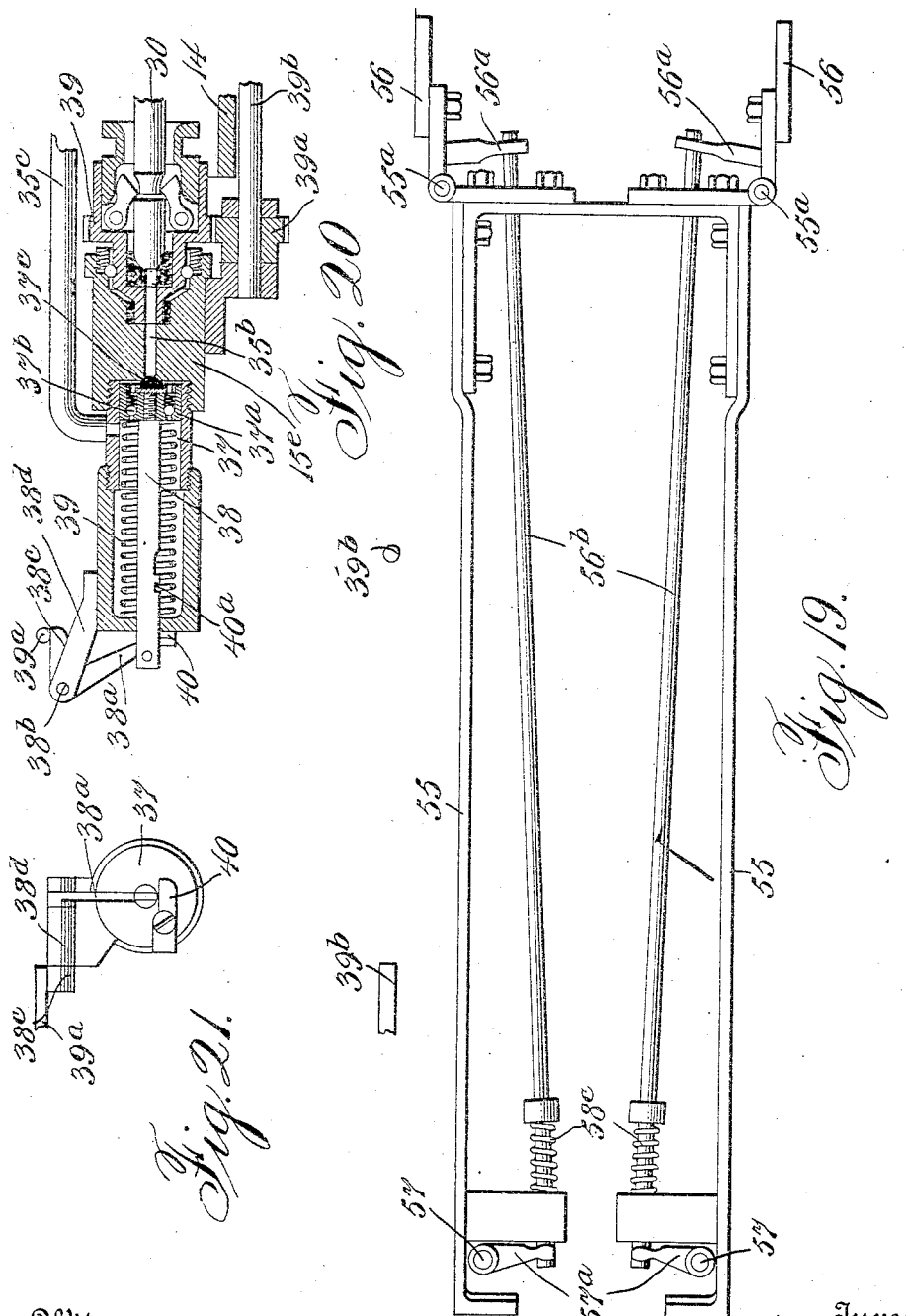

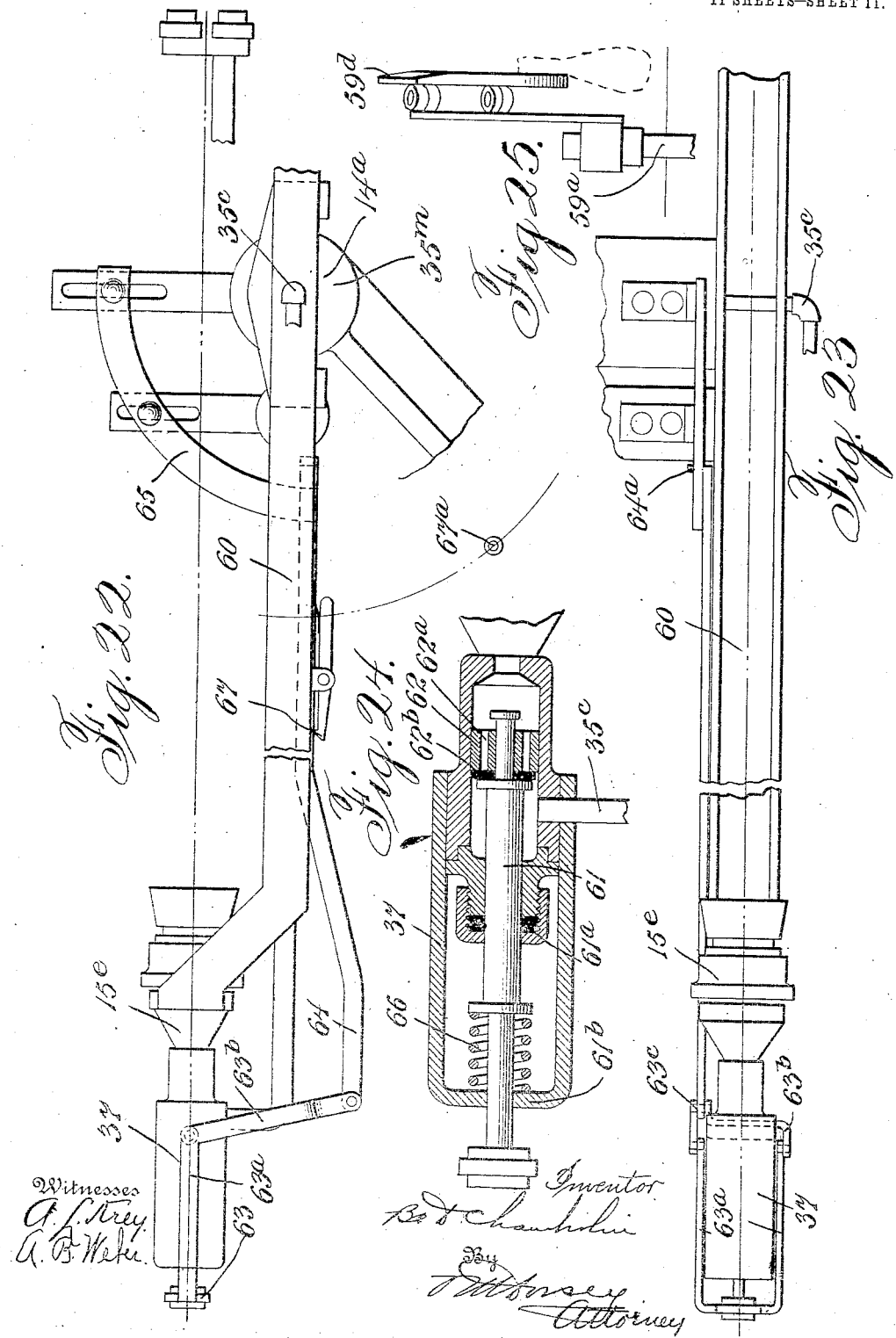

UNITED STATES PATENT OFFICE.

BENJAMIN DAY CHAMBERLIN, OF CORNING, NEW YORK, ASSIGNOR TO EMPIRE MACHINE COMPANY, OF PORTLAND, MAINE, A CORPORATION OF MAINE.

APPARATUS FOR THE PRODUCTION OF GLASS ARTICLES.

1,124,698. Specification of Letters Patent. Patented Jan. 12, 1915.

Application filed January 13, 1911. Serial No. 602,532.

*To all whom it may concern:*

Be it known that I, BENJAMIN D. CHAMBERLIN, a citizen of the United States of America, and a resident of Corning, New York, have invented certain new and useful Improvements in Apparatus for the Production of Glass Articles, of which the following is a specification.

This invention relates to a machine by which a gather of glass on a blow-pipe is marvered, and then blown in a mold. The particular machine shown herein is one adapted to receive and rotate a removable blow-pipe with the gather of glass thereon, and when set in motion by an attendant, to cause the gather on the pipe to be brought into contact with a marverer, on which it is marvered, after which the blow-pipe is positioned vertically over a mold to permit elongation, its rotation at this time being arrested to prevent a twisting of the gather which would result if the center of mass of gather be out of the axis of rotation. After a proper period for elongation the mold is closed and the bulb blown, the mold opened and cooled, and the bulb moved away from the mold. To accomplish these results the machine includes a frame, pivoted on a horizontal trunnion and having a chuck and support adapted to receive and hold a removable blow-pipe; a marverer located adjacent to the plane in which the blow-pipe carried in such frame oscillates and a mold located in the axial line of such blow-pipe when vertical. With these parts is associated power driven mechanism for rotating the blow-pipe; for oscillating the frame to lift the gather on the blow-pipe, whereby it will be rolled along the face of the marverer; for retracting the marverer away from the blow-pipe when the marvering is finished, and for lowering the gather until the blow-pipe is vertical and over the mold, combined with automatic means for arresting the rotation of the blow-pipe when vertical.

It further comprises power driven means for manipulating the mold, and again rotating the blow-pipe and means for admitting air to the blow-pipe at proper times.

The object of the invention is to provide a construction of such a machine as will meet the conditions of glass blowing rooms in which it is desirable to serve as many machines as possible from a single furnace, this necessitating that the machines be of such a character as to fit compactly around the latter. In the machine of this application this is accomplished not only by the compactness of the parts but by their disposition whereby they are arranged as much as possible in a longitudinal direction, that is to say, in the direction in which the blow-pipe is oscillated in passing from marvering to molding position, the machine being narrow. It is also further accomplished by duplicating the parts above described and placing them back upon the same support and gearing them to the same driving power, whereby further economy of space is obtained.

Certain features of the machine, such as means for arresting the rotation of the blow-iron during elongation, means for surrendering the control of the blow-pipe to the mold when the latter closes, the means for effecting the "blow out" and a new and improved clutch for the blow-pipe, possesses utility which is not restricted to a machine of the character described, but are generally applicable to glass blowing machines.

My invention further consists in the construction, arrangement and combination of the several parts embodied in such machine as will be hereinafter more fully described and claimed.

Referring to the accompanying drawings in which corresponding parts are designated by corresponding marks of reference:—Figure 1 is a side elevation of a machine constructed in accordance with this invention, all parts being in their normal position. Fig. 2 is a front elevation thereof, showing two units upon the main frame, the right hand unit of the machine being in normal position and the left hand unit in the blowing position, a portion of the wiper plate of the right hand unit being shown dotted, and the wiper being removed from the left hand unit for clearness of illustration. Fig. 3 is an enlarged fragmental side elevation (showing the cooling tank in section) of the front portion of the machine, the parts being in normal position. Fig. 4 is a vertical transverse section through the upper part of the machine on the line $x^4$—$x^4$ of Fig. 3. Fig. 5 is a similar view through the lower part of the machine on the line $x^5$—$x^5$ of Fig. 3, the mold parts of the right hand unit of the machine being in section and of the left hand unit being in elevation. Fig. 6 is a diagrammatic illustration of the clutch mechanisms, all parts being in normal position. Fig. 6ª is a similar view of the main clutch, but in working position. Fig. 7 is a fragmental top plan of the right hand unit of the machine. Fig. 8 is a detail in elevation of the marverer retracting and releasing mechanism. Fig. 9 is a transverse vertical section on lines $x^9$—$x^9$ of Fig. 8. Fig. 10 is a section through the blow-pipe rotating clutch and driving gear, the parts being in normal position. Fig. 11 is a longitudinal section through the main clutch. Fig. 12 is a transverse section on line $x^{12}$—$x^{12}$ of Fig. 11. Fig. 13 is a similar view on line $x^{13}$—$x^{13}$ of Fig. 11. Fig. 14 is a front end view of the main clutch. Fig. 15 shows the expansion wedges of the main clutch in elevation and plan. Fig. 16 is a plan view of the blow-pipe frame. Fig. 17 is a side elevation thereof, partly in section. Fig. 18 is a detailed plan view, partly in section, of the mold mechanism. Fig. 19 is a plan view of the marverers of both units. Fig. 20 is a fragmental sectional view, showing mechanism for producing a blow-out of the marvered gather. Fig. 21 is an end elevation of the mechanism shown in Fig. 20. Fig. 22 is a side elevation of another and preferred form of blow-pipe frame and mechanism for producing the blow-out. Fig. 23 is a plan view thereof. Fig. 24 is a fragmental longitudinal section of the blow-out mechanism shown in Figs. 22 and 23. Fig. 25 is a detail illustration of the wiper plate and its mounting.

The main frame of the machine may be broadly described as a flat vertical web 1, properly strengthened by surrounding flanges which are broadened out at the bottom to form a base. The lower rear part of the web of the frame is removed to receive an electric motor 2, which by the pinion 2ª, drives the gear 3ª fast on the shaft 3 which is longitudinally mounted in the frame. The front end of the shaft carries a pinion 3ᵇ and the rear end of the shaft drives, by means of the belt 3ᶜ, a longitudinal shaft 4 mounted in the top of the frame and having on its forward end a beveled pinion 4ª. The shaft 4 also imparts motion to the piston 5ª of an air pump 5 mounted in the upper rear part of the frame. From the pump the air as compressed is delivered to a reservoir 6, formed by an offset portion 1ᵇ of the upper part of the frame web, and by a cover plate 6ª. In front of the base of the frame and suitably attached thereto is the mold cooling tank 7.

In that form of the invention which is preferred the parts above described are common to two blowing and molding devices which are independent in their action, each forming an independent unit located upon opposite sides of the frame, and for the purposes of imparting motion to these separate devices there are mounted longitudinally and side by side in the frame above the shaft 3, two shafts 8, each of which has sleeved thereon a pinion 8ª, meshing with the pinion 3ᵇ. In some figures of the drawings the two units are shown, and in others for simplicity only one, but inasmuch as they are similar in all respects only one of them will be here described, it being understood that it should be desired to use the other it would be constructed in the same manner and be located upon the opposite side of the frame symmetrically with that which will be referred to.

The pinion 8ª sleeved in the shaft 8 is adapted to be locked thereto by a clutch 9 shown in detail in Figs. 11 to 15. As there shown this clutch comprises four segments 9ª, contained within the internal groove 8ᵇ of the hub of the pinion and adapted to be pressed outwardly to bear thereon by the rear beveled ends of wedges 9ᵇ projecting in recesses between the adjacent ends of the segments 9ª, the wedges being guided in longitudinal slots cut in the periphery of a sleeve 9ᶜ keyed to the shaft 8. The forward ends of the wedges are contained in and fastened to a collar 9ᵈ, slidably mounted on the shaft and provided with an annular groove 9ᵉ in which engages a yoke 10, by which the collar may be forced rearwardly to cause the wedges to expand the clamping segments 9ª and thus lock the pinion 8ª to the shaft 8. When so shoved rearwardly the clutch will remain locked until the collar is forcibly drawn forward. The shaft 8 when locked to the pinion 8ª as before described, drives, through a worm 11ª on its forward end, a worm wheel 11 mounted on a stub shaft 11ᵇ on the side of the main frame and near the front thereof, the worm wheel being fast to a disk 12, from which the various movements, except that of the rotation of the blow-pipe, attendant upon the operation of the machine, are derived.

The top of the front of the main frame is bifurcated and formed into two arms 13ª, each of which laterally projects beyond the corresponding side of the main frame and has formed therein a transverse bearing 13, to receive the hollow trunnion 14ª, of the blow-pipe frame 14, which, as shown, consists of a piece of angle iron of suitable length, on one end of which (herein called the upper or rear end) is mounted a blow-pipe chuck 15, while on the opposite (or lower or front end) of the blow-pipe frame is the blow-pipe support 17, adapted to receive a blow-pipe. The detail construction of these parts which is preferred will be hereinafter described. The trunnion 14ª of the blow-pipe frame extends through the bearing 13 and has fast on its inner end a pinion 18, meshing with a rack segment 18<sup>a</sup> on the vertical arm of a bell-crank 18<sup>b</sup>, pivoted on a stub shaft at 18<sup>c</sup>, projecting from the side of the frame, the horizontal arm of the bell-crank projecting rearwardly from its pivotal point and carrying a roller 18<sup>d</sup>, contained in a cam track 19 on the outer side of the disk 12, the two arms of the bell-crank being in different vertical planes. This track comprises a portion 19<sup>a</sup> by which the lower end of the blow-pipe frame, through the segment, will be slowly lifted on the rotation of the disk from normal position, a portion 19<sup>b</sup> by which it will be lowered, a concentric portion 19<sup>c</sup> which permits the rotation of the disk when the frame is lowered without affecting the position of the blow-pipe frame, and a portion 19<sup>d</sup> by which the blow-pipe frame will be quickly lifted back to its normal horizontal position.

In a bearing 20<sup>a</sup> projecting from the side of the main frame near its bottom at the front end thereof is journaled a tubular shaft 20, having fast thereon a pinion segment 20<sup>b</sup>, meshing with a rack segment 21, carried on the depending arm of a bell-crank 21<sup>a</sup>, journaled at 21<sup>b</sup> to the side of the main frame, the upper arm of the bell-crank engaging in a cam track 21<sup>c</sup> on the inner face of the disk 12. The forward end of the tubular shaft 20 terminates in a cross head 20<sup>e</sup>, on the forward end of which is pivoted by a pivot pin 20<sup>d</sup> parallel with the axis of the mold cavity, the two halves 22, 23 of the separable mold. The cam track 21<sup>c</sup> has a portion 21<sup>d</sup> so shaped that it will impart such motion to the bell-crank 21<sup>a</sup> as to oscillate the tubular shaft through a limited arc, sufficient to drop the mold halves into the water of the cooling tank 7 and then raise them, this occurring while the blow-pipe frame is being swung rapidly upward to normal horizontal position.

Within the tubular shaft 20 is mounted for axial and rotary movement a shaft 24, which extends outwardly beyond the cross head 20<sup>e</sup>, and has slidably mounted thereon collars 22<sup>a</sup> and 23<sup>a</sup>. The collar 22<sup>a</sup> is fast on the shaft and has two diametrically opposite trunnions, the lower of which is journaled in a rearward extension 22<sup>b</sup> of the mold half 22, while the other receives the forwardly extending arm of a bell-crank 24<sup>a</sup> journaled at 24<sup>b</sup> in the rear end of the cross head 20<sup>e</sup>, the opposite arm of the bell-crank being connected by the link 24<sup>c</sup> with the opposite half 23, the construction being such that as the collar 22<sup>a</sup> is pressed inwardly the mold halves are closed, and that as it is moved outwardly they are opened. To accomplish the inward movement of the collar 22<sup>a</sup> is the function of the collar 23<sup>a</sup>, which is loose on the shaft 24, a spring 25 being interposed between it and the collar 22<sup>a</sup> to cushion the closing movement and to provide a certain resiliency. The collar 23<sup>a</sup> has trunnions thereon which are mounted in the bifurcated end of the forwardly extending arms of a bell-crank 26, pivoted at 26<sup>a</sup> to a bracket 26<sup>b</sup> projecting from the side of the main frame 1, the laterally extending arm of the bell-crank being connected by a universal joint 27 with the depending arm of a second bell-crank 28, pivoted at 28<sup>a</sup> on the side of the main frame, the upper arm of the last named bell-crank having thereon a roller 28<sup>b</sup> held on the periphery of the disk 12 by a spring 28<sup>c</sup>, there being sufficient play in the parts forming the universal joint to allow for the versed-sine of the arc described by the lever 26 in moving from the position corresponding to the open position of the mold to that corresponding to the closed position thereof. A peripheral enlargement or cam 28<sup>d</sup> is mounted upon the disk in such position that, when the concentric run 19<sup>c</sup> of the disk is holding the blow-pipe frame vertically, it will, by striking the roller, actuate the bell-cranks 28 and 26 to shove the collar 23<sup>a</sup> inwardly on the shaft 24, and thus, through the interposition of the spring 25, close the mold halves. When the cam passes from out of contact with the roller, which occurs while the blow-pipe is still vertical, the spring 28<sup>c</sup> will swing the bell-crank 28, to again move the collar 23<sup>a</sup> outwardly. In this movement the collar will by contacting with the nut 23<sup>b</sup> on the end of the shaft 24, cause an outward axial movement of the shaft, which was pressed inwardly upon the closing of the mold, restoring the mold parts to open normal position.

The blow-pipe chuck 15 consists of a block 15<sup>e</sup> having mounted in its forward end, by ball bearings, a shell 15<sup>a</sup>, in which is pivoted a plurality of jaws 15<sup>b</sup>, the free ends of which project forwardly and which may be forced inwardly toward the axial line of the chuck by a sliding collar 15<sup>c</sup> to engage an annular groove 30<sup>a</sup> in the upper end of the blow-pipe 30 when the latter has been inserted therein by an attendant. The rear inner edge of the collar is beveled at 15<sup>f</sup> and by contacting on its rear movement with the rounded outwardly projecting noses 15<sup>g</sup> on the front ends of the jaws closes the latter upon the pipe with sufficient force to clamp it securely, the jaws being held in this clamping position by the inner cylindrical wall 15<sup>h</sup> of the collar, which is normal to the arc in which the jaws swing and which by the final rearward movement of the collar is brought upon the outside of the noses 15<sup>g</sup>. The gather end of the blow-pipe after its upper end is placed in the chuck is inserted in a support 17, comprising four anti-friction rollers 17<sup>a</sup> mounted in pairs on the angularly bent ends 17<sup>b</sup>, of levers 17<sup>c</sup>, pivoted at 17ᵈ, intermediate of their ends, upon the bottom web of the blow-pipe frame at the forward end thereof, the rear ends of such levers being connected with each other by the toggle-levers 17ᵉ, which are also pivoted at their adjacent ends to the forward end of a rod 17ᶠ, mounted in a guide 17ᵍ, on the blow-pipe frame, the rod being projected forwardly by a coiled spring 17ʰ, interposed between the guide and a block 17ⁱ, fast on the rod, whereby the forward ends of the levers will be pressed together, closing the rollers on the blow-pipe. For the purpose of separating the pairs of rollers to insert the pipe therein the lower end of the block 17ⁱ projects through a slot in the bottom web of the blow-pipe frame, and has connected thereto the forward end of a link 31, the rear end of which is connected to the inner end of a hand lever 31ᵃ pivoted intermediate of its length at 31ᶜ, to the bottom web of the blow-pipe frame, the opposite end of the lever extending outwardly from the side of the blow-pipe frame, where it terminates in a handle, which, when moved forwardly, will, through the connections described, separate the rollers. The hand lever has also connected thereto at its outer end a link 32, extending rearwardly and terminating at its rear end in a yoke 32ᵃ which engages in the groove 15ᵈ of the chuck collar 15ᶜ, whereby the same movement of the hand lever 31ᵃ which separates the anti-friction rollers of the front pipe support will also cause a forward movement of the sleeve to release the upper end of the pipe, thus permitting the ready removal of the latter.

Under certain circumstances, it may be desirable during the molding and blowing that the lower end of the blow-pipe be free to move slightly to allow for imperfect alinement of the blow-pipe frame with the molds although in the machine which I have constructed this is not so. In order to prevent it when wanted the following construction may be used: A lever 33 is pivoted on the bottom surface of the web of the blowing frame, near the forward end thereof, which lever projects inwardly past the inner edge of the blow-pipe frame and is pivoted to the link 31, where it crosses the latter, and a cam 33ᵃ is fixed upon the upper surface of the hub of the bell-crank 18ᵇ on which cam when the blow-pipe frame moves into vertical position for blowing, the said inner end of the lever 33 is adapted to ride, being lifted thereby, and retracting the link 31, whereby the guide rollers will be separated. This separation of the guide rollers at this time due to the cause stated, does not however result in a loosing of the blow-pipe clutch, as the connection between the link 31 and the hand lever 31ᵃ is made by a slot 31ᵈ, in the former. It is furthermore desirable that, when the blow-pipe clutch and support have been actuated to release a blow-pipe upon which an article has been finished, means be provided to hold them in this position until another pipe has been inserted and this is accomplished by a groove 34 in the rear end of the rod 17ᶠ, in which groove one end of a spring pressed trigger 34ᵃ is adapted to engage when the rod has been retracted, the opposite end of the trigger having an inclined face 34ᵇ thereon, which face coacts with a corresponding face 34ᶜ on the link 32, whereby, when the link is shifted to shove the chuck collar rearwardly, the opposite end of the trigger will be drawn out of the seat on the rod and the latter released to be projected forwardly by the spring 17ʰ.

The chuck shell has a packing 35 in its rear end surrounding an axial aperture 35ᵃ, the end of the blow-pipe taking against the packing, and the chuck block 15ᵉ has an air passage 35ᵇ, registering with the aperture 35ᵃ and connected with an air pipe 35ᶜ which enters the hollow trunnion 14ᵃ of the blow-pipe frame, through a head 35ᵈ on the outer end thereof. The inner end of the trunnion has a corresponding head 35ᵉ which has a central packing box 35ᶠ. Into this packing box projects the end of the pipe 35ᵍ, the opposite end of which is connected to an air valve casing 36 mounted on the forward end of the air chamber 6 between the arms 13ᵃ of the main frame and connected with the interior of the chamber. A suitable valve is contained in the casing, the stem 36ᵃ of which rests on the horizontal arm of a bell-crank 36ᵇ, horizontally pivoted at 36ᶜ on a bracket 36ᵈ projecting from the side of the main frame. The other arm of side lever has journaled therein a roller 36ᵉ, running upon a crown cam 36ᶠ, on the inner face of the disk 12, the roller being tangential to the circle of the cam. The cam is so shaped that the valve contained in the valve casing will be moved to admit air from the air chamber to the blow-pipe for molding and if desired for a "blowing-out" of the gather immediately after marvering. It is preferable however to obtain the air pressure for this "blow-out" from an auxiliary air supply, in the form of a combined pump and air valve located in the connection between the air reservoir 6 and the blow-pipe chuck, which forces a limited quantity of air into the gather for the blow-out, and holds for a limited time the pressure thus created therein by sealing the end of the blow-pipe and which then releases such pressure and restores the connection between the blow-pipe and its air supply to permit the air for molding to be introduced into the blow-pipe from the air reservoir when the air valve stem 36ᵃ is actuated. A form of this is shown in Fig. 20, comprising a cylinder 37 which is fast to the rear end of the chuck block 15ᵉ and incloses a piston head 37ᵃ, containing valves 37ᵇ, and having a packing 37ᶜ on its forward end adapted to seal the axial air passage 35ᵇ of the chuck block. The air supply pipe 35ᶜ enters the cylinder near its forward end and the piston head is retracted past the entrance of such pipe by the piston rod 38, the rear end of which extends through the closed end of the cylinder 37, where it is articulated to an arm 38ᵃ rigid on one end of the shaft 38ᵇ, mounted in a projection 38ᵈ on the upper side of the cylinder. The opposite end of the shaft 38ᵇ has a forwardly projecting arm 38ᵉ, which is situated on the inner side of the blow-pipe frame. The piston head is projected forwardly in the cylinder by a spring 39, and is retracted by a stud 39ᵐ located on the main frame in such position that as the blow-pipe frame swings downwardly into vertical position it will, by contacting with the offset arm 38ᵉ, move the latter through a limited arc before escaping therefrom. When so retracted by the arm 38ᵉ and the stud the piston is held in its rearward position against the pressure of the spring by the engagement in a notch 40ⁿ therein of a latch 40ᵐ, pivoted to the head of the cylinder. As the blow-pipe completes its marvering movement a projection 39ⁿ on the side of the main frame below the bearing 12 strikes the opposite end of the latch and releases the piston, which will then be projected forwardly by its spring, driving a quantity of air into the blow-pipe when it will be sealed therein by the closing of the axial aperture of the clutch shell by the packing 37ᶜ, thus insuring a proper swelling of the gather. The axial aperture remains closed until the reversed motion of the blow-pipe toward vertical position causes the stud 39ⁿ to again retract the piston, when the aperture will be opened, placing the interior of the blow-pipe in free communication with the air supply pipe 35ᶜ, to admit molding air when the main air valve is opened.

The chuck shell 15ᵃ has a gear 39 upon its periphery, which is driven by a pinion 39ᵃ on the rear end of the shaft 39ᵇ, mounted on the under side of the bottom web of the blow-pipe frame and having a gear 39ᶜ on its forward end meshing with a beveled idler 39ᵈ mounted in a bracket 39ᵉ on the bottom web of the blow-pipe frame. The idler is driven by the beveled gearing 40ᵃ on the double-face gear ring 40, sleeved on the trunnion 14ᵃ of the blow-pipe frame outside of the bearing 13, thereof, the crowned gearing 40ᵇ of the same ring being driven by a pinion 41, fast on the outer end of a transverse shaft 41ᵃ, journaled in arm 13ᵃ of the main frame in the rear of the bearing 13. The inner end of the shaft 41ᵃ has thereon a beveled gear 41ᵇ driven by the beveled pinion 4ᵃ on the forward end of the shaft 4. A clutch, to be herewith described, is interposed between the shaft 41ᵃ and the gear 41ᵇ, and when such parts are locked by the clutch the blow-pipe will be rotated by the gearing before described.

The operation of the machine comprises an upward movement of the gather by which it is rolled along the marverer (to be hereinafter described) a movement of the marverer away from the vertical plane of movement of the gather, the admission of a puff of air to swell the gather, a downward movement of the marvered gather until the blow-pipe is vertical and the gather is in position to be centered within the mold cavity, a closing of the mold and the admission of the molding air, an opening and dipping of the mold parts for cooling, and the return of the blow-pipe frame with the blow-pipe therein to horizontal position. It is desirable that a period, the length of which depends upon the condition of the glass, etc., elapse between the time at which the blow-pipe becomes vertical and the closing of the mold to permit elongation, and it is further desirable during this period that the rotation of the blow-pipe be arrested. For this purpose the following mechanism is used, which in conjunction with the main clutch, further provides means for initiating the operation of the machine. The yoke 10 of the main clutch is a rigid pendant on the central part of a substantially horizontal lever 42, pivoted intermediate of its length at 42ᵃ on the side of the main frame, the forward end of which lever lies under a depending finger 43ᵃ on the central portion of the controlling lever 43, which is mounted by having its opposite ends guided in slots 43ᵇ in the end flanges 1ᵃ of the main frame, both of said ends being normally held at the top of the slot by springs 43ᶜ, and thus the depression of either end of the controlling lever depresses the central portion thereof, and the finger 43ᵃ thereon by depressing the forward end of the horizontal lever 42 moves the yoke rearwardly to engage the main clutch, which will be held in driving connection by the friction of its parts. To permit the desired manipulation of the controlling lever its forward end is formed into a handle and its rear end has pivoted thereto the upper end of a link 44, the lower end of which is connected to the rear end of a pedal 44ᵃ, supported at its front end from the base of the frame, and carrying at an intermediate point the pedal 44ᵇ, by which the clutch may be closed to start the movement of the machine after the blow-pipe has been placed in the blow-pipe frame. A hammer 45 is pivoted above the yoke lever, the forwardly extending shank thereof having a seat 45ᵃ therein, into which the lower end of a dog 46, pivoted upon the main frame is pressed by the spring 46ª to engage when the head of the hammer is raised, the head being adapted, when it falls, to strike the rear end of the yoke lever, and swing the latter to cause the yoke to pull the collar 9ᵈ of the clutch 9 forwardly to disengage the clutch parts. For the purpose of automatically causing the hammer to fall when the blow-pipe has by the rotation of the disk 12, driven through the clutch, been positioned vertically, the dog is provided with a tail, having a pin 46ᵇ located in the path of a peripheral cam 47 on the disk, whereby the rotation of the latter at the time stated, by tripping the dog, permits the descent of the hammer to open the clutch, to arrest the rotation of the disk with the horizontal arm of the blow-pipe frame actuating bell-crank 18ᵇ in the concentric run thereof. After the expiration of a proper period to permit elongation of the gather, the attendant depresses the handle of the controlling lever 43, thus again reëngaging the clutch, and the rotation of the disk again starts to cause the actuation of the mold parts, (closing, opening, dipping and restoration to normal position), the actuation of the air valve to admit the blowing air to the gather, and the restoration of the blow-pipe to normal position. Upon the beginning of such rotation of the disk the peripheral projection 47 therein will strike a pin 45ᵇ on the end of the shank of the hammer and cock the latter, it being caught when cocked by the dog 46. The disk 12 will now continue to rotate until a second peripheral projection 47ᵇ on the disk again throws the dog and a second time allows the hammer to drop to arrest the rotation of the disk, the latter at this time being in its initial position. During the initial part of this final rotation of the disk the blow-pipe remains stationary, due to the concentric portion 19ᶜ of the run in the disk, this corresponding to the blowing period. When the blow-pipe with the blown article thereon has been removed and another substituted therefor, the controlling lever is thrown by the pedal 44ᵇ and the rotation of the disk 12 resulting therefrom causes the second peripheral projection to again cock the hammer and set it for disengaging the clutch at the elongation of the gather on such last named pipe. To arrest the rotation of the blow-pipe during the elongation, the following construction is used: The beveled gear 41ᵇ is sleeved on the shaft 41ª and immediately beside it is a collar 48, keyed to the shaft and having an annular groove 48ᵇ and having guided therein for axial movement a pin 49, which is normally projected by a spring 49ª into a recess in the side of the gear, whereby the latter will be normally locked to the shaft. The pin 49 has a shoulder lying in the groove of the collar, and is adapted to be shifted axially by the engagement therewith of the beveled face 50ª on the rear end of a lever 50. This lever is pivoted intermediate of its length to a bracket 51 upon the top of the bearing 13 and its rear end is normally held out of the annular groove 48ᵇ of the collar 48 by the engagement of the front end of the lever with catch 52, mounted upon the outer face of a spring standard 52ª, arising on the inner side of the lever from the main frame, the catch being over the front end of the lever when the rear end thereof is raised out of the groove, and normally maintaining it in this position against the pressure of a spring 52ᵇ. The upward end of the spring standard has an outwardly extending stud 52ᶜ thereon, terminating in a beveled face. On the inner face of the blow-pipe frame, in the rear of the trunnion thereof, is mounted a pivoted striker 53, having its front inner end beveled as at 53ª. When the blow-pipe frame swings to position the blow-pipe vertically for elongation, the beveled face on the striker contacts with the beveled end of the stud 52ᶜ, and presses the spring standard inwardly, releasing the lever 50 and permitting the spring 52ᵇ to throw the rear end of the lever into the groove of the collar 48. The rotation of the collar with the gear 41ᵇ will bring the pin 49 therein against the beveled face 50ª on the lever and the pin will be shifted axially thereby and will be drawn from the gear 41ᵇ, disconnecting the blow-pipe from the motor and permitting it to come to rest. To reëngage the clutch after the elongation and to cause the pipe to resume its rotation during the molding, the forward end of the lever 50 is connected with the corresponding end of the controlling lever 43, by a link 54, whereby as the former is moved by its handle to reëngage the main clutch after the elongation, the lever will also be shifted to raise the rear end thereof out of the groove in the collar 48, permitting the pin 49 to be again shot to engage the gear 41ᵇ. This movement of the clutch handle may be effected by an attendant who stands facing the machine and who has the right hand unit opposite his left hand or it may be accomplished automatically by the elongation of the gather by mechanism. Mechanism suitable for this latter purpose is shown for instance in British patent to Marks 5795 of 1911. To permit the return of the controlling lever to normal position after the lever 50 has been positioned to cause the reëngagement of the blow-pipe rotating clutch (when the lever will be held by the catch 52) the link 54 is connected to the lever 50 by a slot connection 54ª. It will be noted that when the blow-pipe frame swings back to horizontal position, after the molding, the striker 53 will turn on its pivot to pass the stud 52ᶜ on the spring standard 52ᵃ without causing movement thereof.

The instrumentalities employed for shaping or marvering the gather preparatory to the elongation and molding may be variously constructed but the following is a description of one which in actual practice has produced satisfactory results: A skeleton frame 55 projects forwardly and upwardly from the bearings 13 and has pivoted to its forward end on each side thereof by the vertical pivot 55ᵃ a marvering plate 56, having an inwardly extending arm 56ᵃ, the marvering plate being so located that upon the upward swing of the blow-pipe frame with a blow-pipe therein having a gather of glass thereon, the latter will roll upon the outer surface of the plate. It is desirable however that the marverer be kept out of contact with the gather upon the descent of the blow-pipe and this is accomplished by the pivotal mounting of the former just described, as the rearwardly extending arm 56ᵃ thereof is connected by the rod 56ᵇ with the upper arm 57ᵃ of the vertical shaft 57 journaled in the marverer frame in the bearing 58ᵃ, the lower end of the shaft having keyed thereon the head 57ᵇ, carrying on its rear end a roller 57ᶜ adapted to be pressed outwardly by a cam 57ᵈ adjustably mounted in the outer face of the web of the rack segment 18ᵃ, whereby when the latter has swung forwardly in the direction of the arrow in Fig. 8 to an extent sufficient to roll the gatherer on the blow-pipe upwardly along the marverer, the latter will by the roller 57ᶜ and the described connection, be moved inwardly on its vertical pivot away from the vertical plane in which the gather is lifted. When the marverer has been moved sufficiently in this direction, its head 57ᵇ will be caught by a latch 58 pivoted on a block 58ᵃ depending from marverer frame. The marverer will thus be held away from the gather when the direction of motion of the rack segment is reversed to lower the gather, until at the end of such movement, a striker arm 58ᵇ upon the forward end of the rack segment lifts the latch and permits the compression spring 58ᶜ upon the rod 56ᵇ to again throw the marverer back to normal position. It will be noted that this spring serves resiliently to hold the marverer against the gather during the marvering. The marverer plate may be cooled by a jet of air directed against it, by a suitable nozzle 58ᵐ as shown in Figs. 1 and 7, or its temperature may be controlled by making it hollow and circulating therein a suitable fluid in the manner shown in my other application filed March 23, 1910, Serial No. 551,198.

In Figs. 22, 23 and 24 is shown a preferred construction of blow out mechanism and of the blow-pipe frame. In these the blow-pipe frame 60 is trough shaped in cross section and is diametrically mounted across the outer end of the hollow trunnion 14ᵃ, and the chuck 15 and the support 17 are raised from the opposite ends thereof, so that the blow-pipe contained in such frame is no longer radial to the center around which it moves. This may be provided for by a slight lengthening of the horizontal distance between the axis around which the hollow shaft 20 turns and the center of the mold cavity and permits the air pipe 35ᶜ to pass axially into the trunnion as shown in Fig. 22. A cylinder 37 is mounted as before on the rear of the chuck block 15ᵉ and contains a piston 61, passing through a stuffing box 61ᵃ in the cylinder, and also through the head 61ᵇ of the cylinder, by which it is guided. The piston has on its forward end a sliding head 62, provided with ports 62ᵃ which when the head is at its rear limit of movement on the piston, are closed by a washer 62ᵇ on the piston in the rear of the head. The rear end of the piston has a cross head 63 thereon, from the opposite ends of which links 63ᵃ project forwardly to the upper ends of a yoke lever 63ᵇ, pivoted at 63ᶜ to a support from the rear end of the blow-pipe frame. To the lower end of the lever 63ᵇ is secured the forward end of the rod 64 guided for longitudinal movement on the inner side of the blow-pipe frame, its forward end terminating in a hook 64ᵃ which is adapted when the blow-pipe frame is moving to vertical position to run upon a track 65 mounted eccentrically on the main frame in respect to the bearing 13, whereby at the time stated the piston will be retracted by the track against the tension of a spring 66. When the piston is so retracted the rod 64 will be caught by a trigger 67 pivoted at the bottom of the blow-pipe frame, which trigger is adapted to be released from the rod by a pin 67ᵃ on the main frame as the gather reaches its upper limit of movement.

It may be desirable to provide, in addition to the marverer before described, a wiper plate 59ᵈ, shown in Figs. 1, 3 and 25, into contact with which the revolving gather is brought on its descent to molding position and immediately before disposition for elongation. Such a plate may be adjustably mounted on its standard 59ᵃ on the front of the cooling tank, being offset from the standard, as shown, to permit the body of the blown articles to pass the latter when the blow-pipe frame returns to normal position, the plate itself being in the proper plane and at the proper elevation to contact with that part of the marvered gather which is to form the neck of the article. The effect of such contact is not only to reduce the diameter of the gather at this point (which is aided by the convex face of the wiper) to permit the molding of small necked articles but also to cool such portions of the gather, which during the elongation prevents too great thinning of the walls at the point under the weight of the lower part of the gather. I make no claims to this wiper plate as the same forms no part of my invention, but is the invention of another.

Inasmuch as claims of this application are under requirements of the Patent Office restricted to the means for rotating and arresting the rotation of the blow-pipe, I do not by failure to herein make claims to other features, abandon the same, as such other features as are shown herein, are shown merely in compliance with the statute and to show a complete machine embodying, in the best manner known to me, at the date of this application, the particular invention here sought to be protected, and the showing of such other features and the foregoing detailed description of the embodiment of the blow-pipe rotating and arresting means have been given for clearness of understanding and no undue limitation should be induced therefrom, but the claims should be construed as broadly as possible in view of the prior art. Claims covering certain of such features other than the blow-pipe rotating and arresting means, as illustrated by embodiments thereof different from those shown herein are made in my other applications, Serial Number 491,812, filed April 23, 1909, Serial Number 551,198, filed March 23, 1910, and Serial Number 607,179 filed February 7, 1911, while claims to certain of such other features, as illustrated by the embodiment thereof shown herein, are made in my other applications, Serial Number 649,557, filed September 15, 1911, Serial Number 737,402, filed December 18, 1912, and Serial Number 737,403, filed December 18, 1912, as divisions hereof.

Having thus described my invention what it is desired to secure is:—

1. In a glass blowing machine, the combination of a mold, of a movable blow-pipe frame and a blow-pipe carried thereby, means for moving the blow-pipe frame to present the gather on the pipe contained therein vertically to the mold, means for rotating the pipe prior to and during molding, and means actuated on the movement of the pipe to vertical position to temporarily arrest the rotation of the pipe.

2. In a glass blowing machine, the combination with a movable blow-pipe frame and a blow-pipe carried thereby, of a marverer, a mold mechanism, means for moving the frame to marver the gather on the pipe contained therein and to present it to the mold, and means for rotating the pipe during the marvering and blowing and to temporarily arrest its rotation between the marvering and blowing.

3. In a glass blowing machine, the combination with a movable blow-pipe frame and a blow-pipe carried thereby, of a marverer, a mold mechanism, means for rotating the blow-pipe frame to marver the gather on the pipe contained therein and to present it vertically to the mold for molding and elongation; means for rotating the blow-pipe during marvering and molding and means actuated on the movement of the frame from marvering position to arrest the rotation temporarily between the marvering and molding while the blow-pipe is presented vertically.

4. In a glass blowing machine, the combination with a frame and a blow-pipe carried thereby, of a mold mechanism, a motor, driving connections from the motor to move the blow-pipe frame to present the blow-pipe therein to the mold and for rotating the blow-pipe, means for simultaneously discontinuing both of said connections, means for subsequently restoring them, and means for finally discontinuing the connection between the motor and the frame.

5. In a glass blowing machine, the combination with a frame and a blow-pipe carried thereby, of a mold mechanism, a motor and connections for moving the blow-pipe frame for presenting the pipe therein to the mold and for rotating the pipe, mechanism actuated by the motor for discontinuing the said connections when the blow-pipe has been presented to the mold, and means for restoring the said connections.

6. In a glass blowing machine, the combination with a frame and a blow-pipe carried thereby, of a mold mechanism, a motor and connections for moving the frame for presenting the blow-pipe therein to the mold and for rotating the blow-pipe, mechanism actuated by the motor for discontinuing the said connections when the blow-pipe has been presented to the mold, means for restoring the said connections, and mechanism actuated by the motor for again discontinuing the connection between the blow-pipe frame and the motor without discontinuing the connection between the pipe and the motor.

7. In a glass blowing machine, the combination with a frame and a blow-pipe carried thereby, of a marverer, a mold mechanism, means for rotating the blow-pipe, a motor, a normally closed clutch interposed between the motor and blow-pipe rotating means, a disk driven by the motor and connected with the frame to move the same and actuate the mold mechanism, a clutch between the motor and the disk, means for closing the last named clutch to drive the disk to present the gather on the blow-pipe in the frame to the marverer and the mold, a projection on the disk adapted to open both clutches when it is so driven, means for closing both clutches to drive the disk to close and open the molds and to move the gather on the blow-pipe away from the mold and to rotate the blow-pipe, and a second projection on the disk to open the disk-driving clutch when the disk has returned to normal position.

8. In a glass blowing machine, the combination with a frame and a blow-pipe carried thereby, of a marverer, a mold mechanism, actuating means for the frame, a motor, means for rotating the blow-pipe in the frame, a normally closed driving connection between the mold and the pipe rotating means and a normally open driving connection between the motor and the frame-actuating means, means for closing the last named driving connection and for thereby moving the frame to present the gather on the pipe carried therein to the marverer and to the mold, means actuated by the motor for then discontinuing both of said driving connections, means for subsequently restoring both of such driving connections to actuate the mold mechanism and to rotate the gather in the mold and for removing it when molded from the mold, and means actuated by the motor for then discontinuing the driving connection between the motor and the frame-actuating means.

9. In a glass-blowing machine, the combination with a glass-working spindle and with a mold and closing mechanism therefor, of means for positioning the spindle vertically for elongation in operative relation to the mold prior to the closing thereof, and means for holding the spindle against rotation during and prior to the closing of the mold and for rotating the spindle after the closing of the mold.

10. In a glass-blowing machine, the combination with a glass-working spindle moving about a horizontal axis and with a mold, and closing mechanism therefor, of means for moving the spindle around its horizontal axis, and for positioning it vertically for elongation in operative relation to the mold, and means correlated with the spindle-moving and mold-closing means for rotating the spindle during its movement and while the mold is closing and for holding it against rotation during the elongation.

11. In a glass-blowing machine, the combination with a glass-carrying spindle moving about a horizontal axis, and a mold, and means for closing the same, of means for moving the spindle about its horizontal axis to position it in operative relation to the mold, and automatic means for rotating the spindle while moving about its horizontal axis and after the mold is closed, and for holding the blow-pipe against rotation while in operative relation to the mold prior to the closing thereof.

In testimony whereof I have signed my name in presence of two witnesses.

BENJAMIN DAY CHAMBERLIN.

In presence of—
  ALBERT L. KREY,
  ALICE B. WEBER.